United States Patent
Johns et al.

(10) Patent No.: US 6,674,841 B1
(45) Date of Patent: Jan. 6, 2004

(54) METHOD AND APPARATUS IN A DATA PROCESSING SYSTEM FOR AN ASYNCHRONOUS CONTEXT SWITCHING MECHANISM

(75) Inventors: Charles Ray Johns, Austin, TX (US); Wei Kuo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 09/661,280

(22) Filed: Sep. 14, 2000

(51) Int. Cl.[7] ............................................. H04M 1/64
(52) U.S. Cl. ................ 379/67.1; 379/88.09; 379/88.11; 379/88.14; 379/88.15; 379/265.03; 379/265.06
(58) Field of Search ...................... 379/67.1, 83, 88.09, 379/88.11, 88.14, 93.15, 93.17, 100.01, 265.03, 265.06, 266.06; 345/502, 506, 509, 519

(56) References Cited

U.S. PATENT DOCUMENTS

| | | | |
|---|---|---|---|
| 4,510,351 A | * 4/1985 | Costello et al. | ........ 379/265.01 |
| 5,291,608 A | 3/1994 | Flurry | ........................ 395/725 |
| 5,367,680 A | 11/1994 | Flurry et al. | ................. 395/650 |
| 5,430,841 A | * 7/1995 | Tannenbaum et al. | ...... 395/164 |
| 5,455,958 A | * 10/1995 | Flurry et al. | ................. 395/800 |
| 5,621,789 A | * 4/1997 | McCalmont et al. | ........ 379/265 |
| 5,742,670 A | * 4/1998 | Bennett | ....................... 379/142 |
| 5,798,770 A | * 8/1998 | Baldwin | ...................... 345/506 |
| 5,805,868 A | * 9/1998 | Murphy | ....................... 395/502 |
| 5,911,134 A | * 6/1999 | Castonguay et al. | ........... 705/9 |
| 5,943,064 A | * 8/1999 | Hong | .......................... 345/502 |
| 5,978,940 A | * 11/1999 | Newman et al. | ............. 714/712 |
| 6,044,355 A | * 3/2000 | Crockett et al. | ................ 705/8 |
| 6,100,891 A | * 8/2000 | Thorne | ........................ 345/357 |
| 6,538,656 B1 | * 3/2003 | Cheung et al. | ............. 345/519 |

* cited by examiner

Primary Examiner—Allan Hoosain
(74) Attorney, Agent, or Firm—Duke W. Yee; Mark E. McBurney; Lisa L. B. Yociss

(57) ABSTRACT

A method and apparatus in a data processing system for asynchronous context switching. Requests of graphics processes are received to process graphics data for display in a queue in the graphics adapter. A current context is switched for a first graphics process to a new context for a second graphics process only in response to requests received in the queue. In this manner, the graphics adapter is able to continuously process commands in the queue instead of waiting for new commands to be sent after each context switch.

29 Claims, 4 Drawing Sheets

METHOD AND APPARATUS IN A DATA PROCESSING SYSTEM FOR AN ASYNCHRONOUS CONTEXT SWITCHING MECHANISM

BACKGROUND OF THE INVENTION

1. Technical Field

The present invention relates generally to an improved data processing system, and in particular to a method and apparatus for processing graphics data. Still more particularly, the present invention provides a method and apparatus for switching context information to process graphics data for multiple graphics processes.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. An attribute is used to define how a primitive will be displayed. Attributes include, for example, line style, color, and surface texture. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

With the large amounts of data and computations involved in processing graphics data, especially with three-dimensional applications, many of these computations have been offloaded from the central processing units to a graphics adapter. Within these graphics systems, a graphics pipeline located in the graphics adapter is used to process this graphics data. With a pipeline, the graphics data processing is partitioned into stages of processing elements in which processing data may be executed sequentially by separate processing elements.

In a multi-tasking graphics environment, multiple processes often share the same graphics adapter. In order for each graphics process to send graphics data to the graphics adapter, each process requires a rendering context. This rendering context is restored on the graphics adapter by a context switch handler prior to the graphics data being sent to the graphics adapter from a particular graphics process for display. In a multi-tasking graphics environment for a particular graphics process to render graphics data, a set of registers in the graphics adapter are required to be restored to the proper state before any rendering command from the graphics process can be sent to an adapter first-in-first-out (FIFO) for processing. After the context has been restored, then the graphics process may send rendering commands to the adapter FIFO until its period of time or time slice has expired. When the time slice expires, the current graphics context information, such as those in the context registers are saved from the adapter to a memory, such as system memory. Then, the adapter FIFO may be accessed by another graphics process, which will start another cycle with the restoration of a context for that particular graphics process.

Before access to the FIFO is given to the next graphics process in the multi-tasking graphics environment, the processing of the current FIFO commands should be finished and the context save process for the prior graphics process should be finished. Currently, the current FIFO request or commands must be processed before the context is saved or the unprocessed FIFO requests or commands must be saved as part of the graphics context and restored during the next graphics context restore. In the first instance, the adapter FIFO waits for a new command to be sent after each context save instead of the command waiting in the adapter FIFO for processing. With the second case, the system waits for a direct memory access read/write of the adapter FIFO during each context switch with the system becoming input/output bound instead of taking advantage of a fast graphics processor on the adapter. In either case, delays in context switching and degradation graphics performance occurs.

Therefore, it would be advantageous to have an improved method and apparatus for switching contexts in a multi-tasking graphics environment.

SUMMARY OF THE INVENTION

The present invention provides a method and apparatus in a data processing system for asynchronous context switching. Requests of graphics processes are received to process graphics data for display in a queue in the graphics adapter. A current context is switched for a first graphics process to a new context for a second graphics process only in response to requests received in the queue. In this manner, the graphics adapter is able to continuously process commands in the queue instead of waiting for new commands to be sent after each context switch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood:by reference to the following detailed description of an illustrative embodiment when read in conjunction with the accompanying drawings, wherein:

DETAILED DESCRIPTION OF THE PREFERRED EMBODIMENT

Figure 1:
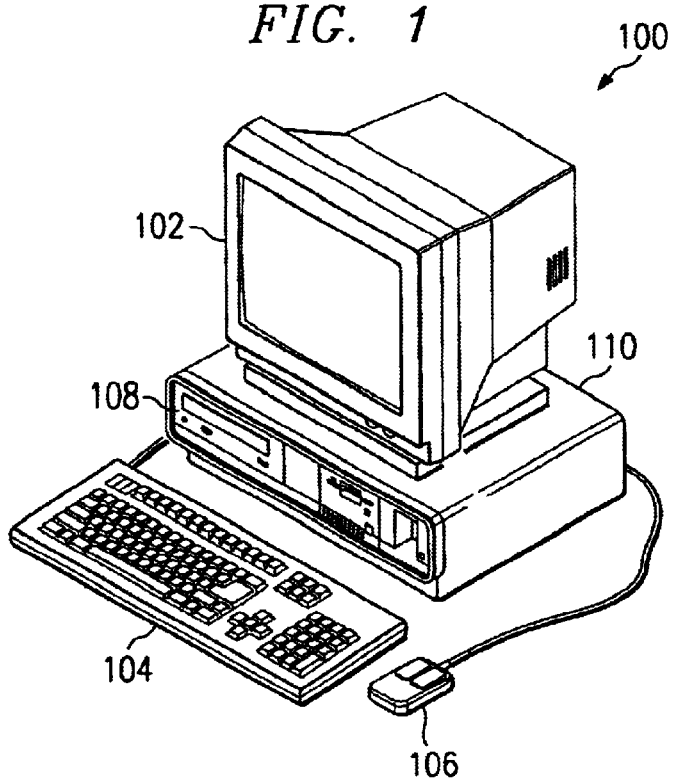
FIG. 1 is a pictorial representation of a data a processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
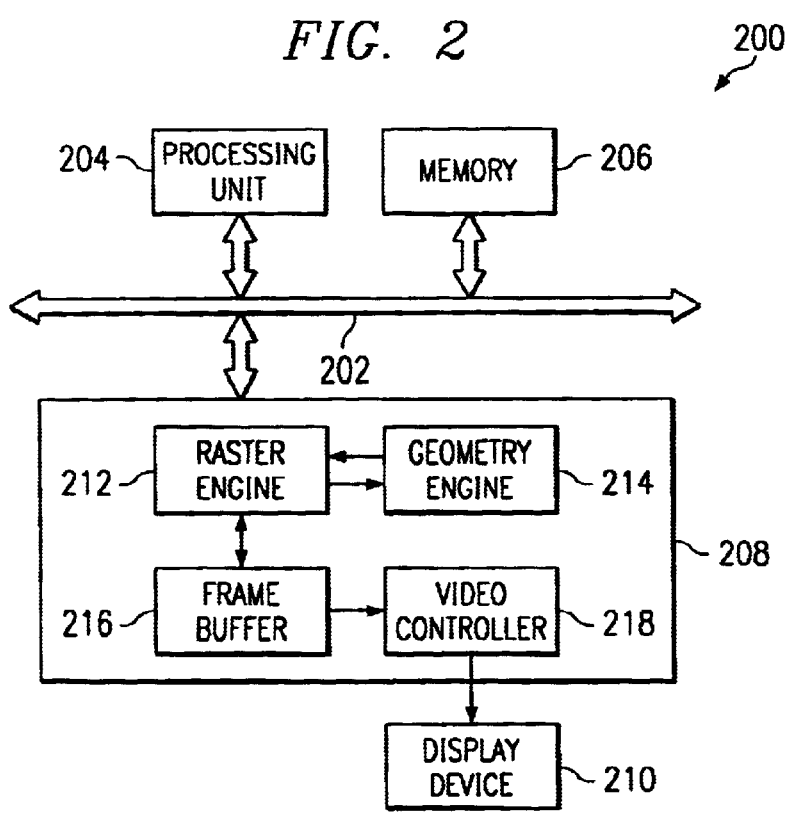
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures, such as Accelerated Graphics Port (AGP) and Industry Standard Architecture (ISA), may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bitmap image while it is "painted" on a screen. Video controller 218 takes the data in frame buffer 216 and generates a display on display device 210. Typically, video controller 218 will cycle through frame buffer 216 one scan line at a time.

Figure 3:
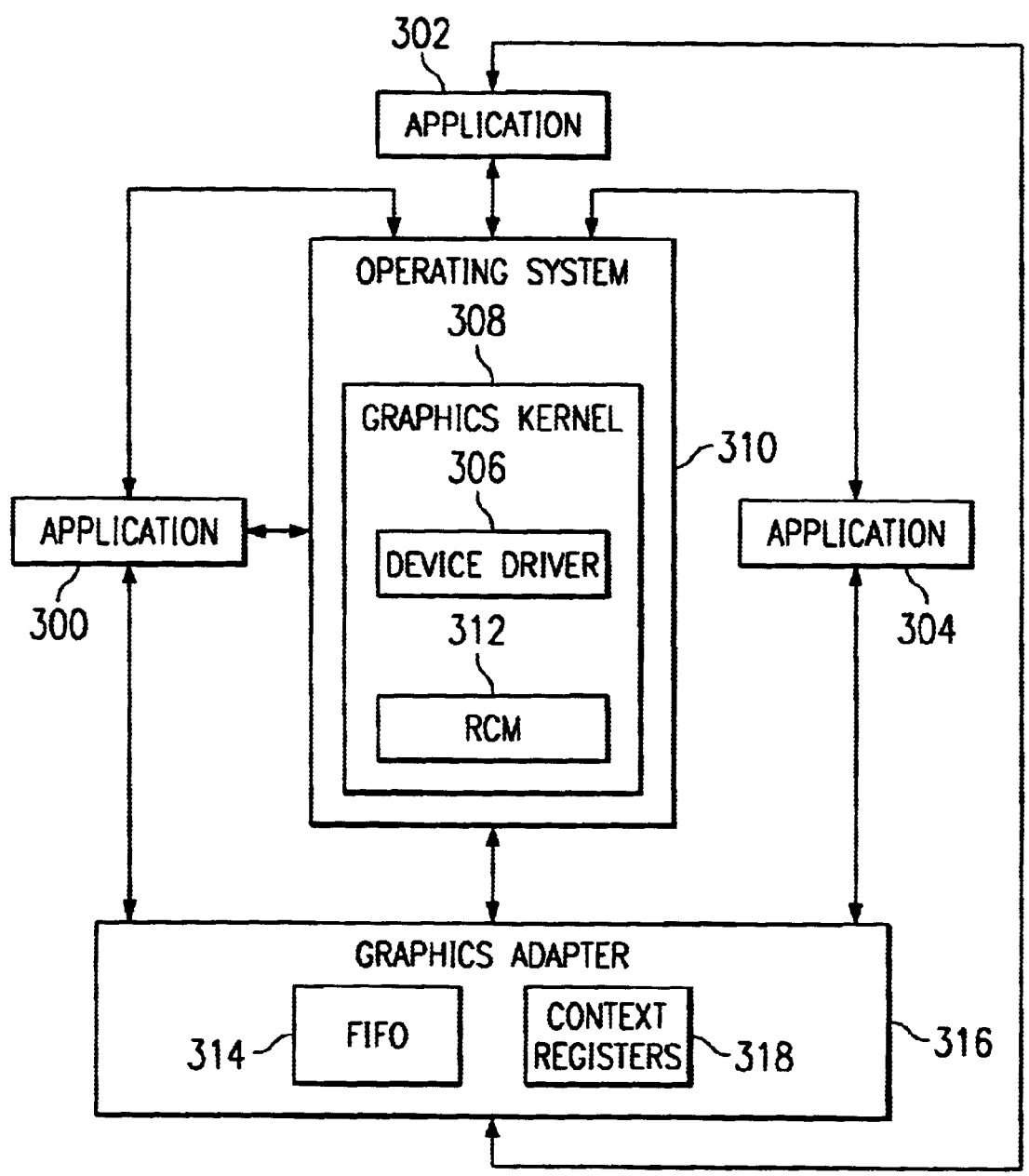
FIG. 3 is a diagram illustrating components used in asynchronous context switching in accordance with a preferred embodiment of the present invention.

The present invention provides a method, apparatus, and computer implemented instructions for asynchronous context switching. Both context restore and context save requests are handled within the same queue as other rendering commands for graphics processes. The queue is used to funnel any command, which may affect the state of context registers. In this manner, waiting for a context switch to be performed before accessing a queue for graphics commands is avoided. Graphics commands including context switch commands and rendering commands are processed continuously independent of the physical completion of the context switch in accordance with a preferred embodiment of the present invention Turning next to FIG. 3, a diagram illustrating components used in asynchronous context switching is depicted in accordance with a preferred embodiment of the present invention. In this example, applications 300, 302, and 304 are located in a multi-tasking graphics environment and share a single graphics adapter, such as graphics adapter 208 in FIG. 2. As shown, each application includes a graphics process, which generates graphics data for display. Of course, depending on the particular application, multiple graphics processes may be present. Applications 300, 302, and 304 send graphics data and commands to device driver 306 within graphics kernel 308 in operating system 310.

Rendering context management (RCM) 312 handles locking and unlocking a domain, which controls whether commands can be sent to an adapter. It also controls whether a context switch should be performed. Device driver 306 is part of the graphics kernel 308. In general, RCM refers to the device independent part of a graphics kernel and device driver refers to the device dependent part of a graphics kernel. A device driver is a program or routine, which links a peripheral device, such as graphics adapter 208 in FIG. 2, to an operating system. In particular, device driver 306 is a graphics device driver and receives requests and data from applications 300, 302, and 304 through RCM 312. Device driver 306 translates the requests and data into a particular command language and format recognized by the peripheral device.

In this example, applications 300, 302, and 304 render graphics data for display by sending rendering commands to a queue, such as FIFO 314 in graphics adapter 316. RCM 312, on the other hand, requests a device driver to send context switch commands, such as context save and context restore commands to the same FIFO to switch context information in context registers 318 as needed. By handling both context restore and context save requests as commands within FIFO 314, device driver 306 does not have to wait for a context switch to complete before access to FIFO 314 is provided to another graphics process. As a result, when the time period or time slice for application 300 ends, application 302 may send rendering commands to FIFO 314 directly, or, the application can send rendering commands through device driver 306 in some special cases (e.g. Cursor, lft, etc.). However, in most cases, rendering commands are sent directly to the adapter FIFO 314 in a continuous manner independent of the physical completion of the context switch of information within context registers 318. Context information may be located in other places other than within context registers 318 depending on the implementation. The mechanism of the present invention also applies to switching context information located in other places. Context information includes information, such as, for example, a line color, a width of a window, a height of a window, and a window type.

Figure 4:
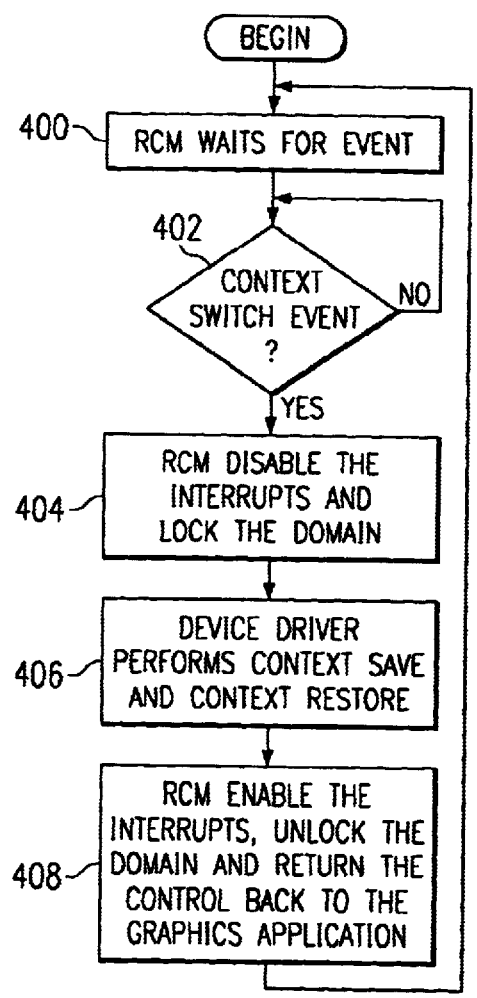
FIG. 4 is a flowchart of a process used for switching context in accordance with a preferred embodiment of the present invention.

Turning next to FIG. 4, a flowchart of a process used for switching context is depicted in accordance with a preferred embodiment of the present invention. The process begins with the rendering context management (RCM) process waits for an event to occur (step 400). The RCM is the device independent part of the graphics kernel. RCM also is referred as a device independent device driver.

Next, a determination is made as to whether the event requires a context switch (step 402). In these examples, the context switch events are a time slice expiration, a graphics fault, a graphics call to change a rendering context, and a release of the time slice. In the time sharing environment, each process has certain period of time of the hardware resource ownership. When the time expires, the current running context will be switched off from the running state and be saved in the system memory and a new context will be switched in if there is a pending context in the graphics fault list waiting to be switched to the running state. When a previous graphics process is to be switched off, but does not become switched off and a current process attempts to write to the adapter, a graphics fault occurs.

Then, the RCM disables the interrupts and locks the domain (step 404). To disable the interrupt means that no other context switch request can be generated (through time slice expiration, graphics fault, etc.). To lock the domain means that no command can be sent to the adapter other than the current process. With interrupts being disabled and the domain being locked, the context switch is ensured to be atomic. The device driver performs a context save and a context restore (step 406). Next, the RCM enables the interrupts, unlocks the domain, and returns the control back to the graphics application (step 408) with the process returning to step 400.

Figure 5:
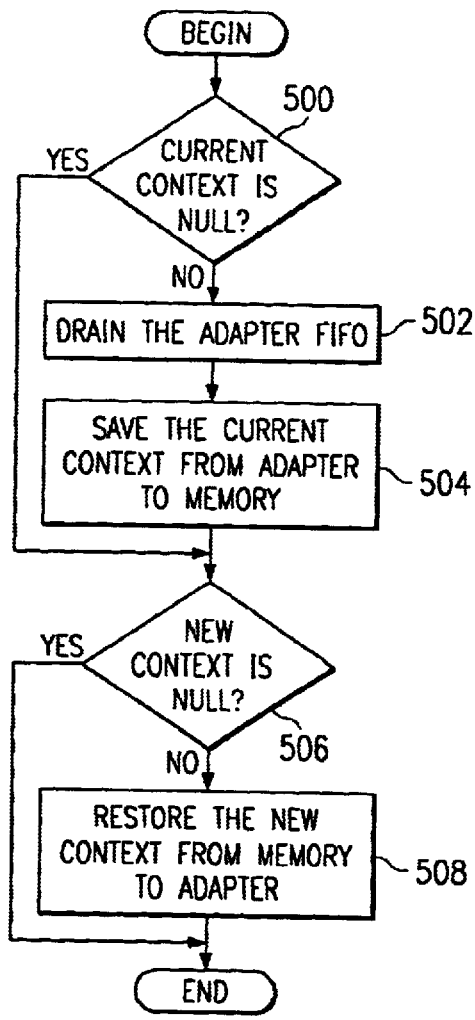
FIG. 5 is a flowchart of a known process used for context switching.

Turning next to FIG. 5, a flowchart of a known process used for context switching is depicted. The process illustrated in FIG. 5 waits for the commands for a graphics process in the FIFO to be processed prior to performing a context switch.

The process begins by determining whether the current context is null (step 500). A null context means that this context is a "bogus" context. A null current context means that no context save to be performed. A null new context means that no context restore to be performed. So, this mechanism is the way for device driver to know if a context save/restore needed to be performed. If the current context is not null, the adapter FIFO is drained (step 502). Next, the current context is saved from the adapter to memory (step 504). In these examples, the context is saved in system memory. A determination is made as to whether the new context is null (step 506). If the new context is not null, the new context is restored from the memory to the adapter (step 508) with the process terminating thereafter.

With reference again to step 500, if the current context is null, the process proceeds to step 506. With reference again to step 506, if the new context is null, the process terminates.

With the process in FIG. 5, the adapter FIFO waits for a new command to be sent after the FIFO is drained on each context save and restore, which slows down the processing in the graphics adapter.

Figure 6:
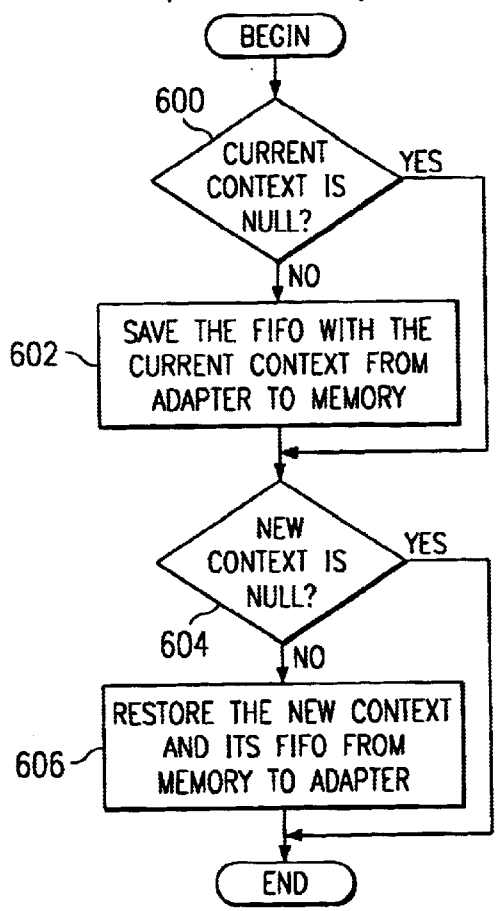
FIG. 6 is a flowchart of a known process used for switching context information.

Turning next to FIG. 6, a flowchart of a known process used for switching context information is depicted. The process illustrated in FIG. 6 is one in which unprocessed commands in the FIFO are saved for a particular graphics process.

The process begins by determining whether the current context is null (step 600). If the current context is not null, the FIFO is saved with the current context from the adapter to memory (step 602). A determination is made as to whether the new context is null (step 604). If the new context is not null, the new context and its FIFO are restored from memory to the adapter (step 606) with the process terminating thereafter.

With reference again to step 600, if the current context is null, the process proceeds to step 604. With reference again to step 604, if the new context is null, the process terminates.

In FIG. 6, the device driver waits for a direct memory access (DMA) read/write of the FIFO during each context switch. This mechanism is input/output bound and does not take advantage of the processing speed provided by a fast graphics processor. The processes used in FIGS. 5 and 6 both delay the context switch process and causes degradation in graphics performance.

Figure 7:
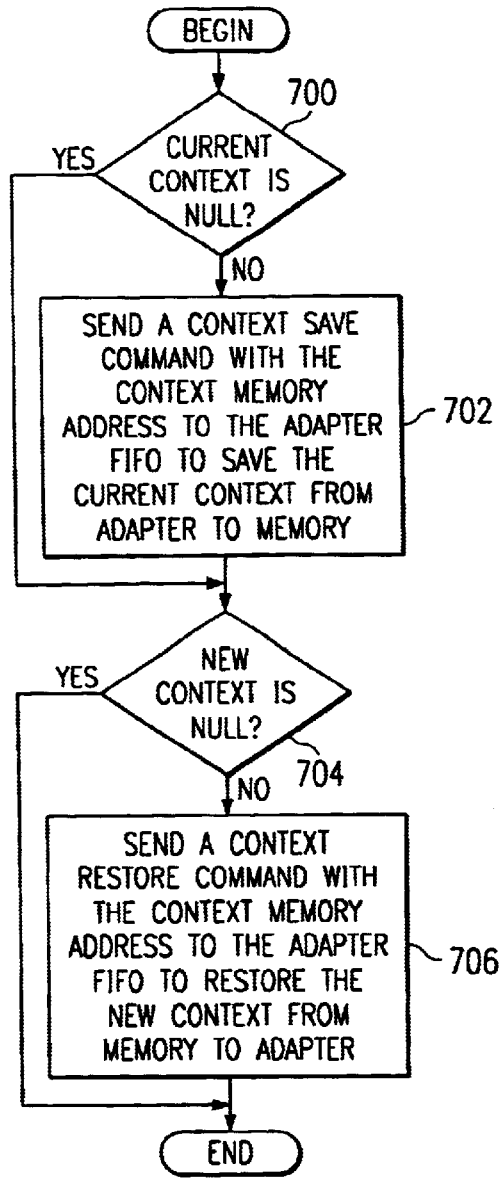
FIG. 7 is a flowchart of a process used for context switching in accordance with a preferred embodiment of the present invention.

Turning next to FIG. 7, a flowchart of a process used for context switching is depicted in accordance with a preferred embodiment of the present invention. The process depicted in FIG. 7 provides for asynchronous context switching without reducing graphics performance as with the known processes described in FIGS. 5 and 6.

The process begins by determining whether the current context is null (step 700). If the current context is not null, a context save command is sent with the context memory address to the adapter FIFO to save the current context from the adapter to memory (step 702). The context memory address is the system memory real address on the host to save the context information. A determination is made as to whether the new context is null (step 704). If the new context is not null, a context restore command is sent with the context memory address to the adapter FIFO to restore the new context from memory to the adapter (step 706) with the process terminating thereafter.

With reference again to step 700, if the current context is null, the process proceeds to step 704. With reference again to step 704, if the new context is null, the process terminates.

The process illustrated in FIG. 7 allows for graphics rendering commands from graphics processes to be sent to the FIFO asynchronously with respect a graphic context switch. This mechanism greatly increases the use of the graphics rendering engine and eliminates having to wait for a FIFO containing rendering commands for a first graphics process to empty before accepting rendering commands for a second graphics process. Additionally, this process is not bound to input/output as with other presently available processes for context switching.

Figure 8:
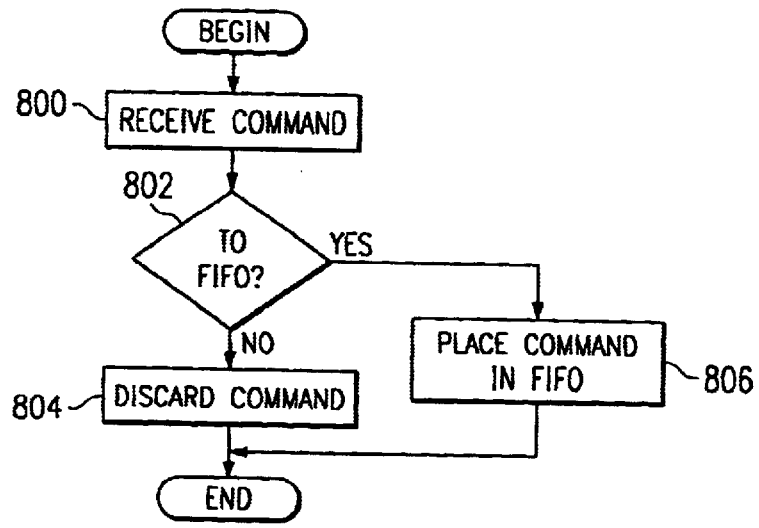
FIG. 8 is a flowchart of a process used for processing commands in accordance with a preferred embodiment of the present invention.

Turning next to FIG. 8, a flowchart of an adapter used for processing commands is depicted in accordance with a preferred embodiment of the present invention. The process illustrated in FIG. 8 illustrates a feature in which rendering commands or requests that directly update context registers are prevented.

The process begins by receiving a command (step 800). Next, a determination is made as to whether the command should go to the FIFO (step 802). If the command will affect context registers and should go to the FIFO but the command does not go to the FIFO, then the command is discarded (step 804). The adapter, in these examples, will not return errors. The adapter simply discards the command or request.

With reference again to step 802, if the command will affect context registers and is being sent to the FIFO, the command is placed in the FIFO (step 806) with the process terminating thereafter. This mechanism prevents any direct update of the context registers. Of course, other processes or mechanisms that prevent the direct update of context registers may be employed.

Figure 9:
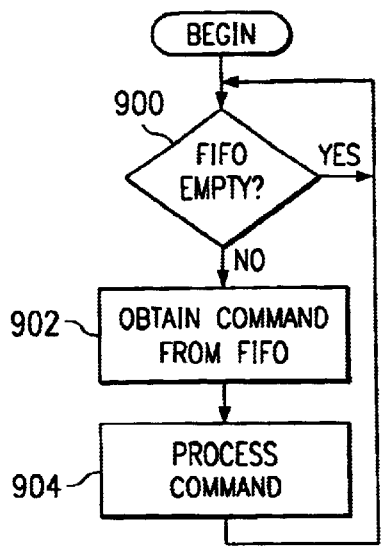
FIG. 9 is a flowchart of a process used for processing commands in a first-in-first-out (FIFO) memory in accordance with a preferred embodiment of the present invention.

Turning next to FIG. 9, a flowchart of an adapter used for processing commands in a first-in-first-out (FIFO) memory is depicted in accordance with a preferred embodiment of the present invention.

The process begins by determining whether the FIFO is empty (step 900). If the FIFO is not empty, the command is obtained from FIFO (step 902). Then, the command is processed (step 904) with the process returning to step 900.

With reference again to step 900, if the FIFO is empty, the process returns to step 900. This process is used to handle context switch requests, such as context save and context restore requests, as well as rendering commands from graphics processes. The context switch requests are treated as commands within the FIFO. This handling of context switching commands allows for asynchronous context switching in which rendering commands may be continuously sent in a manner independent of the physical completion of the context switch. In this manner, the graphics adapter is able to continuously process FIFO commands instead of waiting for new commands to be sent after each context switch. Thus, the performance of the graphics adapter is improved.

Implementation of the mechanism of the present invention requires that context register and rendering commands be sent through the FIFO. Additionally, the graphics adapter should be configured to prevent the direct update of the graphics context registers or other context information in the graphics adapter. Attempts to directly update context registers or other context information should be ignored by the graphics adapter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the commands may be stored in any type of memory used by the graphics adapter other than the FIFO illustrated. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for asynchronous context switching, the method comprising:

providing a graphics adapter that is capable of processing graphics data;

generating a first plurality of commands utilizing a first graphics application for producing a first graphical depiction;

generating a second plurality of commands utilizing a second graphics application for producing a second graphical depiction;

including a queue in said graphics adapter, said queue for storing commands, said queue receiving and processing commands continuously with no wait period;

providing access to said queue to said first application for processing said first plurality of commands;

receiving a context switch command within said queue to switch from a first context that is associated with said first graphics application to a second context that is associated with said second graphics application;

in response to a receipt of said context switch command, providing access to said queue to said second application for processing said second plurality of commands regardless of whether said context switch has been completed; and receiving, by said queue, said second plurality of commands before all of said first plurality of commands have finished being processed by said queue, said queue not having to empty before accepting said second plurality of commands.

2. The method of claim 1, wherein commands in the queue are processed in a first-in-first-out basis.

3. The method of claim 1, further comprising the steps of:

executing said context switch command including:

saving the first context; and loading the second context in the graphic adapter.

4. The method of claim 3, wherein the graphics adapter includes a set of context registers and wherein the step of saving the first context comprises:

saving information in the set of context registers to a storage device.

5. The method of claim 1, wherein the graphics adapter uses one of a raster rendering engine and a geometry engine.

6. The method according to claim 1, further comprising the step of providing access to said queue to said second application for processing said second plurality of commands prior to a completion of said context switch, wherein ones of said second plurality of commands are received within said queue prior to said completion of said context switch.

7. The method according to claim 1, further comprising the step of processing commands stored within said queue continuously independent of the physical completion of said context switch.

8. The method according to claim 1, further comprising said queue being capable of storing both context switch commands and rendering commands.

9. A method in a data processing system for processing context switch commands, the method comprising:
   providing a graphics adapter that is capable of processing graphics data in order to produce a graphical depiction;
   including a queue in said graphics adapter, said queue for storing graphics data commands, said queue receiving and processing commands continuously with no wait period;
   processing all context switch commands through said queue; and
   receiving, by said queue, said second plurality of commands before all of said first plurality of commands have finished being processed by said queue, said queue not having to empty before accepting said second plurality of commands.

10. The method of claim 9, wherein the graphics data commands are received from a plurality of graphics processes.

11. The method of claim 9, wherein the queue processes commands on a first-in-first-out basis.

12. A data processing system comprising:
   a bus system;
   a communications unit connected to the bus system;
   a graphics adapter that is capable of processing graphics data in order to produce a graphical depiction;
   a queue included in said graphics adapter, said queue for storing commands, said queue receiving and processing commands continuously with no wait period;
   a memory connected to the bus system, wherein the memory includes as set of instructions;
   a processing unit connected to the bus system, wherein the processing unit executes the set of instructions to generate a first plurality of commands utilizing a first graphics application for producing a first graphical depiction, generate a second plurality of commands utilizing a second graphics application for producing a second graphical depiction, provide access to said queue to said first application for processing said first plurality of commands, receive a context switch command within said queue to switch from a first context that is associated with said first graphics application to a second context that is associated with said second graphics application; and in response to a receipt of said context switch command, provide access to said queue to said second application for processing said second plurality of commands regardless of whether said context switch has been completed; and
   said queue receiving said second plurality of commands before all of said first plurality of commands have finished being processed by said queue, said queue not having to empty before accepting said second plurality of commands.

13. The data processing system of claim 12, wherein the bus system is a single bus.

14. The data processing system of claim 12, wherein the bus system includes a primary bus and a secondary bus.

15. The data processing system of claim 12, wherein the processing unit includes a plurality of processors.

16. The data processing system of claim 12, wherein the communications unit is one of a modem or Ethernet adapter.

17. A data processing system for asynchronous context switching, the data processing system comprising:
   a graphics adapter that is capable of processing graphics data;
   generating means for generating a first plurality of commands utilizing a first graphics application for producing a first graphical depiction;
   generating means for generating a second plurality of commands utilizing a second graphics application for producing a second graphical depiction;
   a queue included in said graphics adapter, said queue for storing commands, and said queue receiving and processing commands continuously with no wait period;
   providing means for providing access to said queue to said first application for processing said first plurality of commands;
   receiving means for receiving a context switch command within said queue to switch from a first context that is associated with said first graphics application to a second context that is associated with said second graphics application;
   in response to a receipt of said context switch command, providing means for providing access to said queue to said second application for processing said second plurality of commands regardless of whether said context switch has been completed; and
   said queue receiving said second plurality of commands before all of said first plurality of commands have finished being processed by said queue, said queue not having to empty before accepting said second plurality of commands.

18. The data processing system of claim 17, wherein commands in the queue are processed in a first-in-first-out basis.

19. The data processing system of claim 17, further comprising:
   executing means for executing said context switch command including:
      saving means for saving the first context; and
      loading means for loading the second context in the graphic adapter.

20. The data processing system of claim 19, wherein the graphics adapter includes a set of context registers and wherein the saving means comprises;
   saving means for saving information in the set of context registers to a storage device.

21. The data processing system of claim 17, wherein the graphics adapter uses one of a raster rendering engine and a geometry engine.

22. The system according to claim 17, further comprising providing means for providing access to said queue to said second application for processing said second plurality of commands prior to a completion of said context switch, wherein ones of said second plurality of commands are received within said queue prior to said completion of said context switch.

23. The system according to claim 17, further comprising processing means for processing commands stored within said queue continuously independent of the physical completion of said context switch.

24. The system according to claim 17, further comprising queue being capable of storing both context switch commands and rendering commands.

25. A data processing system for processing context switch commands, the data processing system comprising:
   a graphics adapter that is capable of processing graphics data in order to produce a graphical depiction;
   a queue included in said graphics adapter, said queue for storing graphics data commands, and said queue receiving and processing commands continuously with no wait period;
   processing means for processing all context switch commands through said queue; and said queue receiving a second plurality of commands associated with a second context before all of a first plurality of commands associated with a first context have finished being processed by said queue, said queue not having to empty before accepting said second plurality of commands.

26. The data processing system of claim 25, wherein the graphics data commands are received from a plurality of graphics processes.

27. The data processing system of claim 25, wherein the queue processes commands on a first-in-first-out basis.

28. A computer program product in a computer readable medium for use in a data processing system for asynchronous context switching, the computer program product comprising:

instruction means for providing a graphics adapter that is capable of processing graphics data in order to produce a graphical depiction;

instruction means for generating a first plurality of commands utilizing a first graphics application for producing a first graphical depiction;

instruction means for generating a second plurality of commands utilizing a second graphics application for producing a second graphical depiction;

instruction means for including a queue in said graphics adapter, said queue for storing commands, and said queue receiving and processing commands continuously with no wait period;

instruction means for providing access to said queue to said first application for processing said first plurality of commands;

instruction means for receiving a context switch command within said queue to switch from a first context that is associated with said first graphics application to a second context that is associated with said second graphics application;

in response to a receipt of said context switch command, instruction means for providing access to said queue to said second application for processing said second plurality of commands regardless of whether said context switch has been completed; and instruction means for receiving, by said queue, said second plurality of commands before all of said first plurality of commands have finished being processed by said queue, said queue not having to empty before accepting said second plurality of commands.

29. A computer program product in a computer readable medium for use in a data processing system for processing context switch commands, the computer program product comprising:

instruction means for providing a graphics adapter that is capable of processing graphics data in order to produce a graphical depiction;

instruction means for including a queue in said graphics adapter, said queue for storing graphics data commands, and said queue receiving and processing commands continuously with no wait period;

instruction means for processing all context switch commands through said queue; and instruction means for receiving, by said queue, a second plurality of commands associated with a second context before all of a first plurality of commands associated with a first context have finished being processed by said queue, said queue not having to empty before accepting said second plurality of commands.

* * * * *